(12) United States Patent
Soane et al.

(10) Patent No.: US 6,846,856 B1
(45) Date of Patent: Jan. 25, 2005

(54) MIXED ORGANIC AND INORGANIC COMPOSITES WITH INTERMINGLED FACIAL LAYERS

(75) Inventors: David S. Soane, Emeryville, CA (US); Christopher D. Tagge, Emeryville, CA (US)

(73) Assignee: Innovative Construction and Building Materials, Emeryville, CA (US)

( * ) Notice: Subject to any disclaimer, the term of this patent is extended or adjusted under 35 U.S.C. 154(b) by 51 days.

(21) Appl. No.: 10/442,467

(22) Filed: May 20, 2003

Related U.S. Application Data
(60) Provisional application No. 60/381,930, filed on May 20, 2002.

(51) Int. Cl.$^7$ .............................. C08K 3/26; C08K 3/36
(52) U.S. Cl. ........................ 524/2; 524/401; 524/600; 524/612; 524/650; 524/788
(58) Field of Search ............................ 524/2, 401, 600, 524/612, 650, 788

(56) References Cited

U.S. PATENT DOCUMENTS

| | | | |
|---|---|---|---|
| 4,134,815 A | 1/1979 | Jackson et al. ......... 204/159.22 |
| 4,228,218 A | 10/1980 | Takayanagi et al. .......... 525/58 |
| 4,346,214 A | * 8/1982 | Blount ....................... 528/275 |
| 4,766,182 A | 8/1988 | Murdoch et al. ........... 525/413 |
| 4,800,219 A | 1/1989 | Murdoch et al. ........... 525/413 |
| 4,892,786 A | 1/1990 | Newkirk .................. 428/307.3 |
| 4,902,515 A | 2/1990 | Loomis et al. .............. 424/486 |
| 4,981,696 A | 1/1991 | Loomis et al. .............. 424/486 |
| 5,026,809 A | 6/1991 | Dietmar et al. ................. 528/4 |
| 5,223,584 A | 6/1993 | Lenke et al. ................ 525/405 |
| 5,288,842 A | 2/1994 | Feger et al. ................. 528/335 |
| 5,336,522 A | 8/1994 | Balhadere et al. .......... 427/226 |
| 5,391,647 A | 2/1995 | Yamamoto et al. ......... 525/479 |
| 5,482,551 A | 1/1996 | Morris et al. ............... 106/772 |
| 5,679,433 A | 10/1997 | Hayashi et al. ............. 428/116 |
| 5,972,447 A | 10/1999 | Hata et al. .................. 428/35.7 |
| 6,228,163 B1 | 5/2001 | Espinoza et al. ........... 106/778 |
| 6,252,000 B1 | 6/2001 | O'Brien ...................... 525/199 |
| 6,294,612 B1 | 9/2001 | O'Brien ...................... 525/199 |
| 6,342,284 B1 | 1/2002 | Yu et al. ....................... 428/70 |
| 6,406,535 B1 | 6/2002 | Shintome .................... 106/705 |
| 6,451,876 B1 | 9/2002 | Koshy ......................... 523/219 |
| 2003/0084980 A1 | 5/2003 | Seufert et al. ................ 156/39 |
| 2003/0154888 A1 | 8/2003 | Yu et al. ...................... 106/772 |
| 2004/0045481 A1 | 3/2004 | Sethuraman et al. ........ 106/674 |

FOREIGN PATENT DOCUMENTS
GB 815184 6/1959

* cited by examiner

Primary Examiner—James J. Seidleck
Assistant Examiner—Melanie Bissett
(74) Attorney, Agent, or Firm—Christopher Paradies; Fowler White Boggs Banker, P.A.

(57) ABSTRACT

A composite structure comprises an inorganic discrete phase, an organic matrix phase and an interfacial layer comprising both the inorganic and organic phases. In one process, the inorganic discrete phase is partially dissolved and the precipitated by a chemical reaction forming an interfacial layer having a finite thickness and transitioning from 100% inorganic to 100% organic.

7 Claims, 1 Drawing Sheet

MIXED ORGANIC AND INORGANIC COMPOSITES WITH INTERMINGLED FACIAL LAYERS

RELATED APPLICATION

This application claims the benefit of U.S. Provisional Application No. 60/381,930 to Soane, entitled "Mixed Organic and Inorganic Composites with Intermingled Interfacial Layers," filed May 20, 2002.

FIELD OF THE INVENTION

The field of the invention is composite structures having organic matrix and inorganic discrete phases.

BACKGROUND OF THE INVENTION

Inorganic materials are used in many structural applications, including concrete, wallboard, ceramics and other formable and moldable structures. Organic matrix materials are often added as binders to help the inorganic materials to adhere into a certain shape or to improve the mechanical properties of the composite.

The effectiveness of particulate and/or fibrous discrete phases is highly dependent on the coherency of the discrete phase with the matrix phase. By coherency it is meant the degree of adhesion and binding between the discrete phase and the matrix phase.

Mixed organic and inorganic composites have focused on interfacial adhesion between the organic phase and the inorganic phase, e.g. selecting a polymer chemistry that forms a bond with the inorganic phase. However, the sudden transition from organic to inorganic phase causes a reduction in the fatigue life and increased thermal mismatch.

SUMMARY OF THE INVENTION

A composite structure comprises an inorganic discrete phase, an organic matrix phase and an interfacial layer of finite thickness between the organic phase and the inorganic phase. By discrete phase it is meant any of the conventional discrete phases such as particulate or fibrous shapes, including regular or irregular, large or small, and short or elongated shapes. By matrix phase it is meant a binder or continuous percolation network, as well as a conventional matrix of continuous material having isolated, discrete reinforcements.

One object is to provide material/process combinations that create distinct interfacial layers between inorganic discrete phase and organic matrix phase that comprises both the inorganic and organic phases within the interacial layer. The inorganic and organic phases co-mingle and co-exist spatially creating a strong physical adhesion between the inorganic discrete phase and the organic matrix phase.

It is another object to create a transition region of finite thickness between the inorganic discrete phase and the organic matrix phase that reduces interfacial mismatch in properties that affect fatigue life and temperature sensitivity.

It is yet another object to provide an efficient process for the inorganic discrete phase to be consolidated into a dense composite via a forming process.

It is believed, without being limiting in any way, that the interfacial layer created by the present invention creates interpenetrating roots and/or a roots in soil linkage between the inorganic and organic phases. In one embodiment, at least some of the precipitates extend from a partially dissolved inorganic discrete phase into an organic matrix phase.

In another embodiment, the organic matrix phase is crosslinked to form a root network interlinking the precipitating phase.

BRIEF DESCRIPTION OF THE FIGURES

For the purpose of illustrating the invention, representative embodiments are shown in the accompanying figures, it being understood that the invention is not intended to be limited to the precise arrangements and instrumentalities shown, but only by the language of the claims.

DETAILED DESCRIPTION

Figure 1:
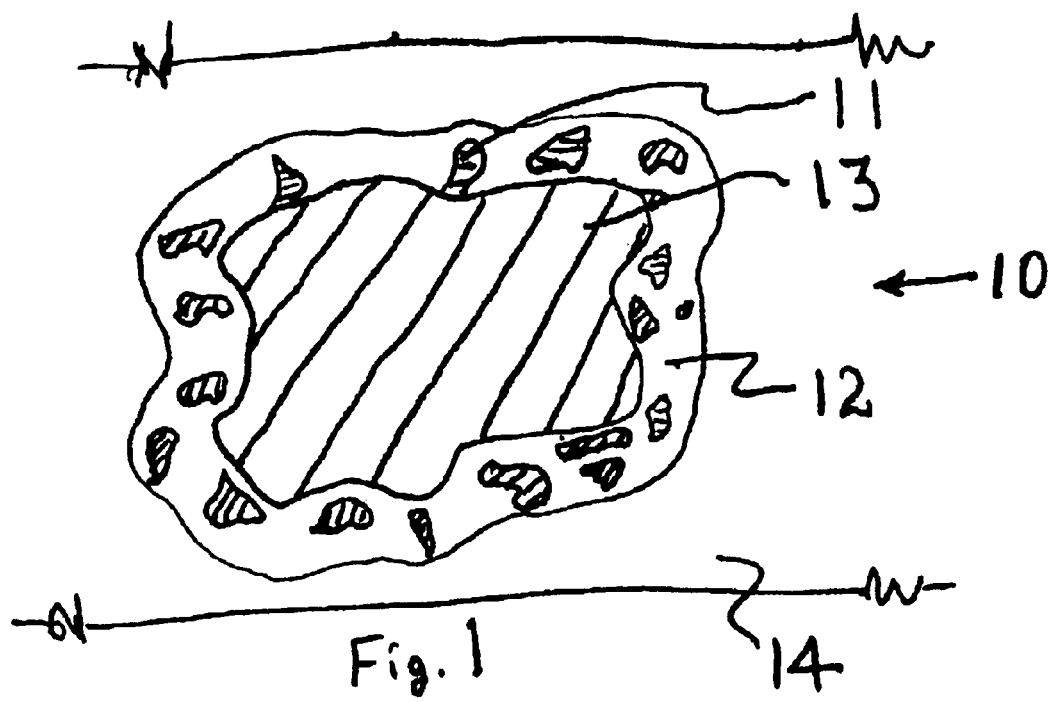
FIG. 1 shows a sketch of one embodiment of the present invention.

Examples of the present invention will now be described in detail for specific embodiments of the invention. These embodiments are intended merely as illustrative examples and procedures for producing fiber and/or particle reinforced composites. The invention is not to be limited to these specific examples, but only by the language of the claims themselves.

In one embodiment of the invention, a composite structure comprises an inorganic discrete phase, an organic matrix phase and an interfacial layer. The interfacial layer is formed around the discrete phase by partial dissolution of the discrete phase followed by precipitation of the dissolved discrete phase in the interfacial layer, as shown in FIG. 1, for example. In FIG. 1, the inorganic particulate and/or fiber remaining after partial dissolution 13 is surrounded by an interfacial layer 12 having precipitates 11 in binder 14.

In one embodiment, at least a portion of the precipitates 11 are nucleated and grown from the partially dissolved discrete phase 13. Thus, a strong, cohesive interface layer 12 forms between the discrete phase 13 and the matrix phase 14. For example, the particles are covered with a liquified or solvated layer. The chemical composition of this layer comprises dissolved or swollen inorganic compounds, as well as a compatable polymer or polymer precursors or mixtures of polymers and polymer precursors. Then, a precipitating agent is added to the layer that causes the precipitation of the dissolved inorganic compound. In one alternative embodiment, the precipitating agent also causes polymerization of polymer precursors.

For example, silica dissolves in a strong base. Fine particles of silica that are partially dissolved in a strong base are lubricated by the liquid layer and the sharp edges of the the irregular silica powder particulates are rounded, which facilitates packing of the silica into a dense composite. In one embodiment, the strong base is comprised of a comparable basic polymer or polymer precursor, such as a polyamine. Preferably, the polyamine is one of a polyethylene imine, ethylene diamine, and a hexamethylene diamine. After a stable and densely packed dispersion is achieved, a precipitating agent is added, such as a polyanhydride. For example, the anhydride groups are pendant from rubbery or rigid polymeric backbones.

In alternative embodiments, the polymers are branched or linear, and homopolymer or co-polymer. For example, the precipitating agent is an acidic polymer or pre-polymer that neutralizes the strong base. In a preferred embodiment, a polyanhydride has a relatively low molecular weight within the range commonly associated with small molecules or oligomers, and the dispersion is easily mixed with the acidic precipitating agent, increasing manufacturing throughput and reducing costs.

In one embodiment, exposure to the anhydride causes the basic amine-containing compound to react with the acidic additive as the dissolved silica precipitates. An intimately inter-mingled organic-inorganic hybrid layer is formed directly on the remaining undissolved discrete phase. In one example, the undissolved discrete phase nucleates at least a portion of the inorganic precipitate, which grows from the undissolved discrete phase forming an intimate bond between the precipitate and the discrete phase.

In one preferred embodiment, the at least one of the reactive components is multifunctional, and a crosslinked organic network is formed. Thus, a composite structure comprises an inorganic discrete phase optimally packed and buffered by an interfacial layer surrounded by strong crosslinked polymer network permeating throughout the composite.

In one embodiment, a small amount of alkaline water is present during solvating of the inorganic phase. In a preferred embodiment, a small amount of inorganic particles are added with the acidic precipitating agent, and the inorganic particles absorb the water. For example, calcium sulfate hemihydrated is added and a hydration reaction with the water forms gypsum crystals. Thus, a low shrinkage composite is formed, which may be used for net shape casting or molding processes.

In yet another embodiment, an inorganic discrete phase is solvated by acids. For example, calcium carbonate or base-softened silica are solvated by compatable acids. In one preferred embodiment, polyacids are added, such as a polyacrylic acid, an acrylic acid co-polymer, a polycarboxylic acid or a co-polymer of a carbolic acid. Optionally, other neutral polymers are added (elastomeric or rigid), for example to entangle the polymerizing molecules into a polymer network. In one example, an acid containing dispersion is mixed with a polybasic material, and crosslinking occurs. For example, crosslinking occurs during the nucleation of the inorganic precipitates, creating a highly interlocked interfacial layer.

In another embodiment, either acid or base dissolvable or etchable inorganic particles are used. The polymer precursors are not only compatable with the coexisting inorganic discrete phase, but also the precursors are amenable to free-radical triggered polymerization and crosslinking, such as acrylic and methacrylic compounds and vinyl ethers. In alternative embodiments, the inorganic phase is precipitated by neutraliztion duing polymerization or after the organic network is substantially formed. For example, neutralization is achieved by pendant acidic or basic groups on the network precursor molecules. In one embodiment, the crosslinked network comprises both acid-base pairs and covalent linkages.

In another embodiment, the composite incorporates porosity. For example, porosity is formed using multifunctional reagants that react to form gas during polymerization. For example, polyisocyanates react with polycarboxylic acids or water to evolve carbon dioxide while forming a polyurethane organic matrix phase. Alternatively, porosity is induced by strong agitation during mixing of using surfactants. In other embodiments, dyestuffs and pigments are added for color, metallic colloids are added for luster or for anti-static properties.

In one embodiment, the finite interface layer has a continuous transition from 100% inorganic to 100% organic phase, which creates a composite having superior fatigue resistance. The finite interface layer smooths out sharp discontinuities in the properties, for example the coefficient of thermal expansion, which improves composite properties, while providing satisfactory abrasion resistance, fire retardancy and dimensional stability.

In one embodiment, the composite material is formed into a structure by molding or casting. In a preferred embodiment, the structure is formed a continuous process, such as by feeding the composite mixture into a calendar or extruder and forming a rod or sheet.

Many other reactions and processes are within the scope of the invention, and these examples are merely for illustration. The invention is not limited to these example, but only by the language of the claims.

What is claimed is:

1. A composite structure comprising:
    an inorganic discrete phase;
    an organic matrix phase; and
    an interfacial layer, wherein the interfacial layer is formed by the partial dissolution of the inorganic discrete phase followed by precipitation precipitates, and at least a portion of the precipitates nucleate from the inorganic discrete phase, and the interfacial layer comprises both the precipitates and the organic matrix phase and has a finite thickness.

2. The composite structure of claim 1, wherein the inorganic discrete phase is a silica and the organic matrix phase is formed of a polyamine.

3. The composite structure of claim 2, wherein the polyamine is one of a polyethylene imine, an ethylene diamine and a hexamethylene diamine.

4. The composite structure of claim 3, wherein the precipitation is initiated by a precipitating agent.

5. The composite structure of claim 4, wherein the precipitating agent is an anhydride.

6. The composite structure of claim 3, further comprising gypsum crystals.

7. The composite structure of claim 1, wherein the inorganic discrete phase is a calcium carbonate.

* * * * *